(12) United States Patent
Teixeira De Magalhaes et al.

(10) Patent No.: US 9,591,465 B1
(45) Date of Patent: Mar. 7, 2017

(54) AUTOMATIC DISTRIBUTION OF COMMUNICATION TO USER HAVING COMMON SUBJECT-MATTER INTEREST AND SERVED BY SAME OR ADJACENT BASE STATION

(71) Applicant: Sprint Spectrum L.P., Overland Park, KS (US)

(72) Inventors: Joao C. Teixeira De Magalhaes, Shawnee, KS (US); Vivek Vijayan, Overland Park, KS (US); Oliver Chu, Lexington, MA (US); Xiaodi Yu, Norman, OK (US); Jose Ernesto Almas de Jesus, Jr., Sao Carlos (BR); Sarunya Aroonsirichoke, Allston, MA (US); Veena Chilukala, Dallas, TX (US); Kayla Fowler, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/961,003

(22) Filed: Dec. 7, 2015

(51) Int. Cl.
| | |
|---|---|
| H04W 4/00 | (2009.01) |
| H04W 4/14 | (2009.01) |
| H04L 29/08 | (2006.01) |
| H04W 8/00 | (2009.01) |
| H04W 8/24 | (2009.01) |
| H04W 4/02 | (2009.01) |

(Continued)

(52) U.S. Cl.
CPC ............... *H04W 4/14* (2013.01); *H04L 67/10* (2013.01); *H04W 4/02* (2013.01); *H04W 8/005* (2013.01); *H04W 8/24* (2013.01); *H04W 88/04* (2013.01); *H04W 88/06* (2013.01); *H04W 88/10* (2013.01)

(58) Field of Classification Search
CPC ......... H04W 4/14; H04W 8/005; H04W 4/02; H04W 8/24; H04W 88/06; H04W 88/04; H04W 88/10; H04L 67/10
See application file for complete search history.

(56) References Cited

U.S. PATENT DOCUMENTS

| | | | |
|---|---|---|---|
| 6,304,556 B1 | 10/2001 | Haas | |
| 6,369,705 B1 | 4/2002 | Kennedy | |

(Continued)

OTHER PUBLICATIONS

Office action mailed Sep. 18, 2008 for U.S. Appl. No. 09/993,007 (now abandoned)*.

(Continued)

*Primary Examiner* — Ajit Patel

(57) ABSTRACT

Disclosed are methods and systems to facilitate automatic distribution of communications. In particular, a server may maintain data that indicates at least one registered subject-matter interest respectively for each of a plurality of users. Further, the server may receive a communication from a source user. The source user may be served by a particular base station. In response to receiving the communication, the server may identify one or more target users based on each target user (i) having at least one registered subject-matter interest that matches at least one subject-matter interest of the source user and (ii) being served either by the same particular base station that serves the source user or by a base station adjacent to the particular base station that serves the source user. The server may forward the communication to each identified target user.

14 Claims, 9 Drawing Sheets

(51) Int. Cl.
*H04W 88/04* (2009.01)
*H04W 88/06* (2009.01)
*H04W 88/10* (2009.01)

(56) References Cited

U.S. PATENT DOCUMENTS

| | | | |
|---|---|---|---|
| 6,504,503 B1 | 1/2003 | Saint-Hilaire et al. | |
| 6,542,750 B2 | 4/2003 | Hendrey et al. | |
| 6,681,108 B1 | 1/2004 | Terry et al. | |
| 6,954,790 B2 | 10/2005 | Forslow | |
| 7,136,645 B2 | 11/2006 | Hanson et al. | |
| 8,000,724 B1 | 8/2011 | Rayburn et al. | |
| 9,195,703 B1* | 11/2015 | Kirmse | G06Q 10/02 |
| 2001/0041576 A1 | 11/2001 | l'Anson et al. | |
| 2002/0007414 A1 | 1/2002 | Inoue et al. | |
| 2002/0077080 A1 | 6/2002 | Greene | |
| 2002/0119788 A1 | 8/2002 | Parupudi et al. | |
| 2003/0087646 A1 | 5/2003 | Funato et al. | |
| 2004/0235493 A1* | 11/2004 | Ekerborn | H04W 4/02 455/456.1 |
| 2010/0077017 A1* | 3/2010 | Martinez | H04L 67/18 709/201 |
| 2011/0244800 A1 | 10/2011 | Bogestam et al. | |
| 2014/0012917 A1* | 1/2014 | Baca | G06Q 50/30 709/204 |
| 2014/0213186 A1* | 7/2014 | Gage | H04W 4/023 455/41.2 |
| 2015/0127710 A1* | 5/2015 | Ady | H04W 4/206 709/202 |
| 2015/0296338 A1* | 10/2015 | Xu | H04L 51/20 455/456.3 |
| 2015/0319223 A1* | 11/2015 | Deepak Narayana | H04L 67/10 709/206 |

OTHER PUBLICATIONS

Office action mailed Jul. 9, 2004 for U.S. Appl. No. 09/993,007 (now abandoned)*.
Office action mailed Mar. 6, 2008 for U.S. Appl. No. 09/993,007 (now abandoned)*.
Invertix Corporation IM Anywhere Privacy Management System, http://www.invertix.com/products_features_privacymanagement.hmtl, printed from the World Wide Web on Aug. 14, 2001*.
Invertix Corporation IM Anywhere Mobile Buddy List Features, http://www.invertix.com/products_features_mobilebuddylist.hmtl, printed from the World Wide Web on Aug. 14, 2001*.
Followap Telecommunications, iFollow Products Family, http://www.followap.com/shtml/ifollow_main.shtml, printed from the World Wide Web on Aug. 14, 2001*.
Wireless Developer Network, Addition of Location Management to Wireless IM Set to Drive GPRS Adoption, http://www.wirelessdevnet.com/news/2001/23/news2.hmtl, printed from the World Wide Web on Aug. 14, 2001*.
GartnerGroup, Yahoo!Find-a-Friend: Wireless or Borderless Privacy? http://gartner11.gartnerweb.com/public/static/hotc/hc00088645.hmtl, printed from World Wide Web on Sep. 6, 2001*.
Ericsson, www.telecomcorridor.com/wireless%20horizons/1Coyne.pdf, printed from the World Wide Web on Jun. 27, 2001*.

* cited by examiner

| USER | REGISTERED SUBJECT-MATTER INTEREST |
|---|---|
| USER 38 | PATENT LAW; BASKETBALL; MUSIC; PHILOSOPHY |
| USER 40 | PATENT LAW; THE BEATLES; ACTING |
| USER 42 | GUITAR; BASKETBALL; COFFEE; TEA |
| USER 44 | MOVIE PRODUCTION; PAINTING; PHOTOGRAPHY |

Fig. 2

AUTOMATIC DISTRIBUTION OF COMMUNICATION TO USER HAVING COMMON SUBJECT-MATTER INTEREST AND SERVED BY SAME OR ADJACENT BASE STATION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover between coverage areas, and other functions related to air interface communication.

When a UE operates in a cellular wireless network according to one or more such protocols, the UE may enable a user to engage in various forms of communication. By way of example, a UE may support traditional voice calls, advanced voice over Internet Protocol (VoIP) calls, and text messaging, among other forms of communication. Using any of these various forms of communication, the user could thus initiate or receive communications to or from one or more other users respectively of one or more other UEs.

Further, some UEs, such as smart phones for instance, may enable users to access Internet content and benefit from a seemingly limitless range of application programs and functions. Among these application programs, some application programs provide access to an online social network technology and may thus enable a user to engage in communications by way of the social network technology. For example, a social network technology may enable users to establish social network accounts and social network connections with others, providing a platform for users to conveniently post comments and other content and to view posted comments and content from their connected friends, family, colleagues, and others.

OVERVIEW

In practice, a user may operate a UE to engage in a communication with another UE of another user. In one case, the user may specifically select the other user with whom the user intends to communicate. For example, the user may select a specific contact from a contact list found on the UE, with the specific contact being the other user. And in another example, the user may dial on the UE a specific phone number of the other user, so as to initiate a voice call to the other user for instance. In another case, the UE of the user may receive a communication from another UE of another user, such as when the other user specifically intends to communicate with the user at issue. For example, the other user may select the user at issue from a contact list found on the other UE, so as to initiate transmission of a text message to the UE of the user for instance. In this example, the UE of the user may receive the text message from the other UE and the user could thus use the UE to view the received text message.

In both cases, the user may be limited to engaging in communications with other users that intend to communicate with the user at issue or with other users that the user intends to communicate with, such as with other users that the user personally knows for instance. In some cases, however, the user may seek to engage in communications with other users that the user does not necessarily already personally know. For instance, the user may seek to engage in communications with other users that have the same subject-matter interest (e.g., a specific hobby) as the user. As such, at issue is then how the user can engage in communications with other users that have common subject-matter interest as the user and that the user does not necessarily already personally know.

Disclosed herein are methods and systems to help a user engage in communications with other users that have common subject-matter interest. In accordance with the disclosure, a server may store or otherwise have access to data that indicates subject-matter interest. In particular, the data may include one or more of these interests respectively for each of various users. With this arrangement, the server may receive a communication from a source user (e.g., inputted via a social networking application program on the source user's UE). For instance, the source user may be served by a particular base station and the server could receive the communication via the particular base station. Once the server receives the communication, the server may responsively identify one or more target users based on certain criteria.

More specifically, the server may identify the target users based on each target user having registered subject-matter interest that matches subject-interest of the source user. Moreover, the server may identify the target users based on each target user being served by the particular base station (i.e., the same base station that serves the source user) or by an adjacent base station that is threshold proximate to the particular base station that serves the source user. In an example implementation of the process of identifying target users, the process could specifically involve identifying other users being served by the particular base station (and/or by an adjacent base station) and then identifying, from among these other users, target users having subject-matter interest that matches subject-interest of the source user.

Once the server identifies the target users, the server may then forward the received communication to each of the target users. After forwarding the communication, the server may receive reply communications respectively from one or more of the target users and may forward such reply communications to the source user. Moreover, a respective reply communication may indicate contact information of a respective target user and/or a location of the respective target user, so as to allow the source user to directly contact the respective target user and/or to meet the respective target user at the indicated location. In this manner, the disclosed arrangement may allow a user to engage in communications with other users having common subject-matter interest.

Accordingly, in one respect, disclosed is a method. In accordance with the method, a server may maintain data that indicates at least one registered subject-matter interest respectively for each of a plurality of users. Also, the server may receive a communication from a source user being served by a particular base station. In response to receiving the communication, the server may identify one or more target users based on each target user (i) having at least one registered subject-matter interest that matches at least one subject-matter interest of the source user and (ii) being served either by the same particular base station that serves the source user or by a base station adjacent to the particular base station that serves the source user. The server may then forward the communication to each identified target user.

In another respect, disclosed is a server. The server includes one or more processors, a non-transitory computer readable medium and program instructions stored on the non-transitory computer readable medium and executable by the one or more processors to maintain data that indicates at least one registered subject-matter interest respectively for each of a plurality of users. Also, the program instructions are executable to receive a communication from a source user being served by a particular base station. Additionally, the program instructions are executable to, in response to receiving the communication, identify one or more target users based on each target user (i) having at least one registered subject-matter interest that matches at least one subject-matter interest of the source user and (ii) being served either by the same particular base station that serves the source user or by a base station adjacent to the particular base station that serves the source user. Further, the program instructions are executable to forward the communication to each identified target user.

In yet another respect, disclosed is a wireless communication system. The wireless communication system includes a plurality of base stations comprising at least a particular base station and one or more adjacent base stations each threshold proximate to the particular base station. Also, the wireless communication system includes a server. The server may be configured to maintain data that indicates at least one registered subject-matter interest respectively for each of a plurality of users. Additionally, the server may be configured to receive a communication from a source user being served by the particular base station. Further, the server may be configured to, in response to receiving the communication, identify one or more target users based on each target user (i) having at least one registered subject-matter interest that matches at least one subject-matter interest of the source user and (ii) being served either by the same particular base station that serves the source user or by a base station adjacent to the particular base station that serves the source user. Yet further, the server may be configured to forward the communication to each identified target user.

In yet another respect, disclosed is a non-transitory computer-readable medium having stored thereon instructions executable by a processor to facilitate automatic distribution of a communication to user(s) having common subject-matter interest and served by same or adjacent base station.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

BRIEF DESCRIPTION OF THE DRAWINGS

FIG. 2 shows a table that illustrates mapping correlation data that maps respective subject-matter interest to respective users, in accordance with an example embodiment.

DETAILED DESCRIPTION

Figure 1:
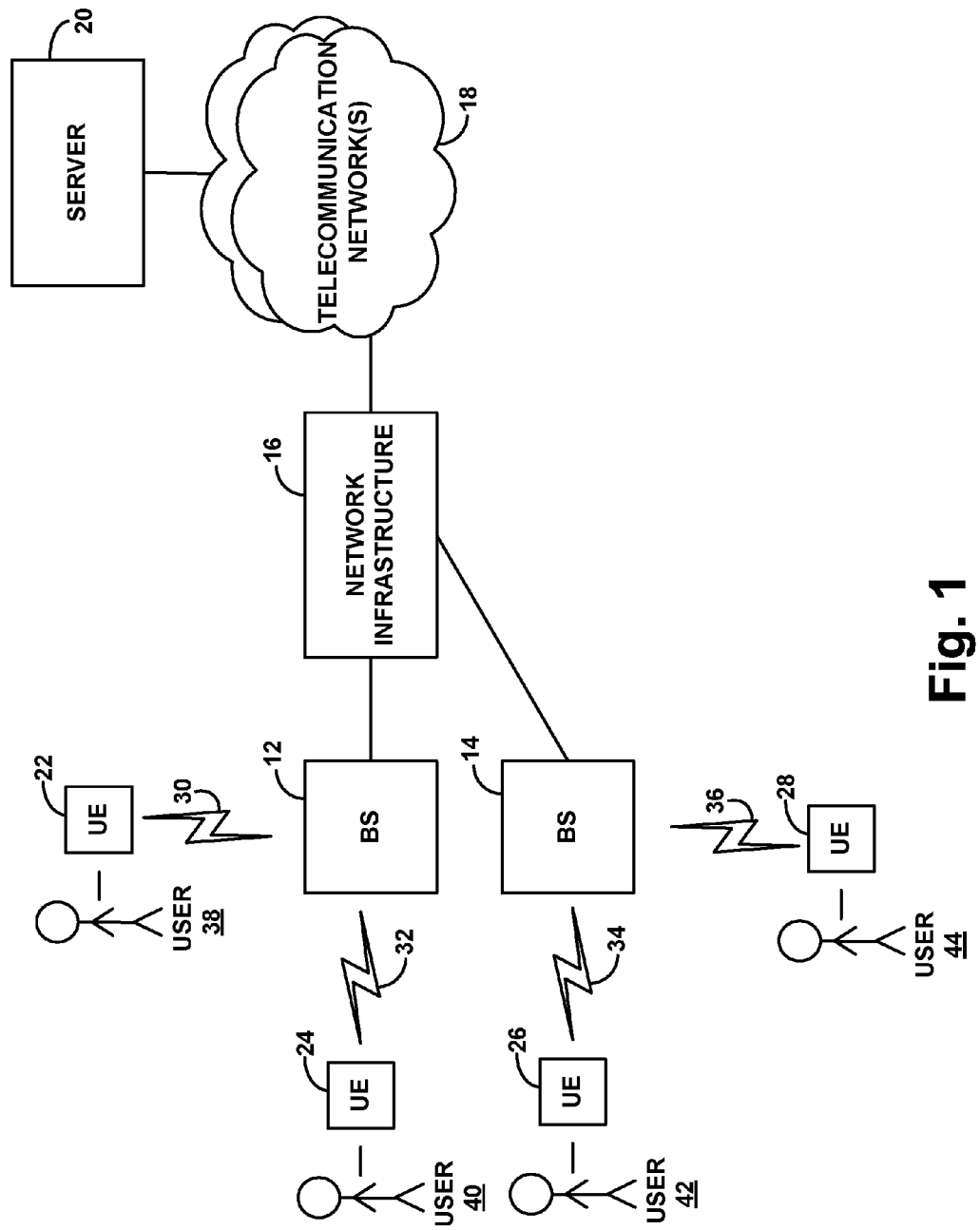
FIG. 1 is a simplified block diagram of an example communication system in which the present method can be implemented.

Referring to the drawings, as noted above, FIG. 1 is a simplified block diagram of an example communication system in which the present method can be implemented. The illustrated communication system includes a representative base station (BS) 12 and a representative adjacent BS 14 each interconnected with network infrastructure 16, such as a switch or gateway, providing connectivity with one or more networks 18 such as transport network(s) (e.g., the PSTN and/or the Internet) and/or core network(s) (e.g., private packet-data networks). Shown on the networks 18 is then a server 20, which may function to receive information from and send information to the network infrastructure 16 and/or to and from other entities. Furthermore, BS 12 is shown as serving a UE 22 of user 38 over a respective air interface 30 as well as a UE 24 of user 40 over a respective air interface 32. Similarly, BS 14 is shown as serving a UE 26 of user 42 over a respective air interface 34 as well as a UE 28 of user 44 over a respective air interface 36. Of course, the BSs 12 and 14 may each serve other users as well.

With this arrangement, the server 20 may receive communications from and/or may transmit communications to one or more of the UEs 22 to 28, such as via the network(s) 18, the infrastructure 16, and one of the respective BSs 12 to 14 for instance. The communications may take various forms. For example, the server 20 may include or may otherwise have access to a social network platform (not shown) that is arranged to facilitate communications between users and perhaps to provide other functionality.

The social network platform can be further arranged to receive registration information from a user, so as to set up or update a respective social network account of the user.

Further, a social network application or browser application on a UE may be arranged to communicate with the social network platform and could thus access a respective user's social network account on the social network platform. In practice, a user's UE may display the social network application to a user, thereby providing the user with accessibility to the user's social network account. For instance, the UE may do so by way of a graphical user interface (GUI) through which the user may interact with the social network application, so as to initiate communications to other users and/or to receive communications from other users.

When the server 20 facilitates communications through the social network platform, the facilitated communications may include text messages, voice messages, and/or video messages, among other possibilities. In some cases, however, the server 20 could additionally or alternatively facilitate communications in ways other than through the social network platform. In particular, the server 20 may facilitate communications to and/or from other applications and/or services included in a UE. For instance, the server 20 may receive and/or transmit (e.g., forward) Short Message Service (SMS) messages, among others. Other forms and types of communication are possible as well.

As noted above, the present disclosure provides for a process that is used to facilitate automatic distribution of a communication to user(s) having common subject-matter interest and served by the same or an adjacent BS. This process could be carried out by server 20 itself and/or by one or more other network entities. For simplicity, however, the process will be described here in a scenario where the server 20 carries out all aspects of the process. And for further simplicity, the process will be described here by referring to the server 20 as receiving and/or transmitting communications to and/or from respective users. It should be understood (without limitation), however, that the server 20 may receive and/or transmit the communications to and/or from users' respective UEs, such as through users' respective social network accounts for instance.

In an example implementation, the server 20 may maintain (e.g. in a data storage of the server 20) data that is indicative of registered subject-matter interest respectively for each of various registered users. The registered subject-matter interest may include a user's hobbies, a user's field of study, a user's favorite places, a user's favorite foods, a user's favorite person, and/or languages spoken by the user, among various other possibilities. Also, a user may register the subject-matter at any time, such as when setting up a social network account through a social network application and/or when updating the social network account through the social network application for instance. Furthermore, the data may take the form of mapping correlation data that maps each registered subject-matter interest to a respective user, such as to the user's respective social network account for example.

FIG. 2 shows a table that illustrates example mapping correlation data 46 that maps respective subject-matter interest to respective users. As shown, user 38 has respective registered subject-matter interest of patent law, basketball, music, and philosophy, user 40 has respective registered subject-matter interest of patent law, The Beatles, and acting, user 42 has respective registered subject-matter interest of guitar, basketball, coffee, and tea, and user 44 has respective registered subject-matter interest of movie production, painting, and photography. Other illustrations are possible as well.

In accordance with the disclosure, the server 20 may receive a communication from a source user, such as from user 38 for example. As noted, the server 20 may receive the communication through the user's 38 respective social network account or may do so in other ways. Also, the communication may include various types of information. For instance, the communication may include textual data, voice data, and/or video data provided by the user 38. Additionally or alternatively, the communication may include a designation of subject-matter interest of the user 38. The designated subject-matter interest could be the same as or different from subject-matter interest that is already registered for the user 38. And if the designated subject-matter interest is different from subject-matter interest that is already registered for the user 38, then the server 20 may be arranged to responsively maintain the designated subject-matter as registered subject-matter for the user 38. Moreover, the user 38 may designate the subject-matter interest in various ways, such as through a drop-down menu on a GUI and/or by providing the subject-matter interest through the textual data, among other options.

Figure 3:
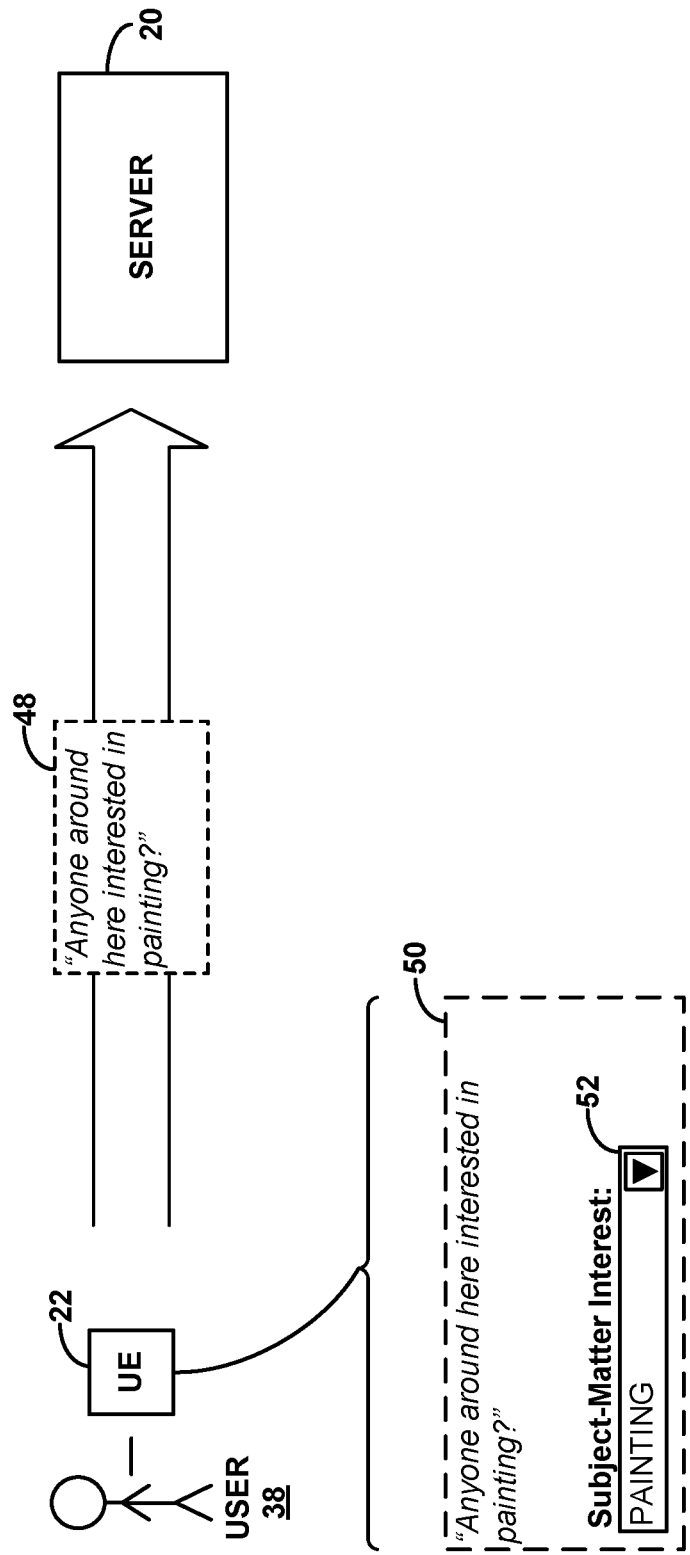
FIG. 3 illustrates a communication that a server may receive from a source user, in accordance with an example embodiment.

FIG. 3 illustrates an example communication 48 that the server 20 may receive from the user 38. In particular, the user 38 may initiate the communication 48 through an example GUI 50 on the UE 22. As shown, textual data is provided to compose a text message that recites "Anyone around here interested in painting?" Also, the GUI 50 provides an example drop down menu 52 through which subject-matter interest of "Painting" is designated. When the communication 48 is transmitted to the server 20, the communication may include the provided textual data. Additionally, the communication 48 may include the designated subject-matter interest, such as in the form of metadata included as part of one or more data packets for the communication 48 for instance. In some cases, however, the communication 48 could also include textual data indicative of the designated subject-matter interest, so that this textual data could be displayed to other users for instance. Other illustrations are possible as well.

Once the server 20 receives the communication from the source user, the server 20 may responsively select one or more target users to whom the server 20 is to ultimately forward the communication. The selection of target users may be based on various factors. In particular, the server 20 may select target users based on each user being served either by the same BS that serves the source user (e.g., BS 12 serving UE 22 of user 38) or by a BS (e.g., BS 14) that is adjacent to the BS that serves the source user, with the adjacent BS being threshold proximate to the BS that serves the source user. Also, the server may select the target user based on each target user having at least one subject-matter interests that matches at least one subject-matter interest of the source user. In some cases, the server 20 may consider other factors as well.

In an example implementation of the process, the server 20 may take one of various approaches to determine one or more target users. For instance, once the server 20 determines that the source user is being served by a particular BS, the server 20 may responsively determine one or more other users also being served by that particular BS. As further discussed in detail below, the server 20 may do so by referring to service data that indicates respective BSs that serve respective users and may thus determine the one or more other users based on the service data. Among these one or more other users, the server 20 may then identify one or more target users based on each target user having at least one subject-matter interest that matches the at least one subject-matter interest of the source user.

Additionally or alternatively, once the server 20 determines that the source user is being served by a particular BS, the server 20 may identify one or more adjacent BSs. And the server 20 may then determine one or more other users each being served by one of the identified adjacent BSs. As further discussed in detail below, the server 20 may do so by referring to the service data that indicates respective BSs that serve respective users and may thus determine the one or more other users based on the service data. Among these one or more other users each being served by one of the identified adjacent BSs, the server 20 may then identify one or more target users based on each target user having at least one subject-matter interest that matches the at least one subject-matter interest of the source user. Other approaches are possible as well.

More specifically, the server 20 may determine the BS that serves the source user in various ways. In one example, the server 20 may store or otherwise have access to service data that indicates respective BSs that serve respective users. To determine or otherwise obtain such service data, the server 20 may receive (e.g., periodically or upon request) service data from network infrastructure, BSs, and/or UEs. The server 20 could thus determine the BS that serves the source user based on the service data. In another example, the communication from the source user may include information indicative of the BS that serves the source user. And the server 20 may determine the BS that serves the source user based on the included information. In yet another example, the server 20 may receive the communication from the source user and may then responsively request an entity (e.g., the network infrastructure) to provide information indicative of the BS that serves the source user. Other examples are possible as well.

When the server 20 determines the BS that serves the source user, the server 20 may also identify one or more BSs that are each adjacent to the BS that serves the source user. In practice, an adjacent BS may define a BS that is located at relative proximity to another BS at issue, such as being located in the same general area the other BS at issue. For instance, an adjacent BS may be arranged to define a coverage area that is in relative proximity to (and perhaps overlapping with) a coverage area defined by the other BS at issue, so that a given UE could hand off from one BS to another without losing coverage for example. Regardless, the server 20 may identify such adjacent BSs in various ways.

For example, the server 20 may include or may otherwise have access to at least one base station almanac (BSA) database. The BSA database may hold data defining certain characteristics of BSs and coverage areas of a radio access network (RAN), such as geographic locations of BSs, coverage scope, centroid locations, azimuths, and the like, with the data being keyed to identifiers of such BSs and coverage areas for instance. Based on data obtained from the BSA database, the server 20 could determine a respective distance between the BS that serves the source user and each of one or more other BSs. And the server 20 may then identify one or more BSs each having a respective distance away from the source user's BS that is below a threshold distance (e.g., established via manual engineering input and/or specified by a user), thereby identifying one or more threshold proximate BSs. Once one or more such adjacent BSs have been identified, the server 20 may then similarly refer to service data for each such adjacent BS to determine one or more other users that the adjacent BS itself serves. Other examples are possible as well.

Furthermore, as noted, the server 20 may identify target users based on each target user having at least one registered subject-matter interest that matches at least one subject-matter interest of the source user. In accordance with the disclosure, the server 20 may determine subject-matter of the source user in various ways. In one case, the subject-matter of the source user may be registered subject-matter of the source user. In this case, the server 20 may thus refer to the above-mentioned maintained data that indicates respective registered subject-matter interest for the source user. And based the maintained data, the server 20 may determine the at least one subject-matter interest of the source user. In another case, as noted, the communication from the source user may itself specify subject-matter interest of the source user. So the server 20 may additionally or alternatively determine subject-matter interest of the source user based on subject-matter interest specified in the received communication. Other cases are also possible.

As part the disclosed process, the server 20 may also determine subject-matter interest of other users (i.e., other than the source user), so as to identify one or more target users among these other users. In accordance with the disclosure, the server 20 may determine subject-matter interest of other users in various ways. For instance, the subject-matter interest of each other user may be registered subject-matter interest. In this instance, the server 20 may thus refer to the above-mentioned maintained data that indicates respective registered subject-matter interest for each of various users. And based the maintained data, the server 20 may determine registered subject-matter interest of one or more users.

Further, the server 20 may sometimes receive one or more communications respectively from one or more other users and each such communication may itself specify subject-matter interest of a respective user. In practice, the server 20 could receive such a communication at the same time that the server 20 receives the communication from the source user or could receive such as a communication at other times. So in such situations, the server 20 could also be arranged to maintain subject-matter interest specified in a received communication as registered subject-matter interest. But regardless of whether the server 20 maintains subject-matter interest specified in a received communication as registered subject-matter interest or whether the server 20 simply receives a communication that specifies subject-matter interest, the server 20 may additionally or alternatively determine respective subject-matter interest of another user based on subject-matter interest specified in a received communication. Other instances are also possible.

Given that the server 20 may determine subject-matter interest respectively of the source user and of one or more other users, the server 20 may compare subject-matter interest of a respective other user to subject-matter interest of the source user and may determine whether or not these subject-matter interests match one another, so as to ultimately determine whether or not the respective other user should be identified as a target user. To do so, for instance, the server 20 may store or may otherwise have access to a respective identifier for each subject-matter interest and thus the server 20 could determine whether or not respective identifiers match one another. But the server 20 could also do so in various other ways.

Regardless, if at least one subject-matter interest of a respective other user (e.g., "basketball") matches at least subject-matter interest of the source user (e.g., also "basketball"), then the server 20 may responsively identify that the respective other user as a target user (e.g., given that the respective other user is also served by the same BS as the source user or by an adjacent BS). And if at least one subject-matter interest of a respective other user (e.g., "patent law") does not match at least one subject-matter interest of the source user (e.g., "guitar"), then the server 20 may responsively determine that the respective other user is not a target user.

To illustrate an example scenario in implementation of this process, refer again to FIGS. 1 to 3. Assuming that user 38 is the source user, FIG. 1 illustrates that BS 12 serves the source user 38 and the server 20 may determine so as discussed above. Also, the server 20 may determine that user 40 is being served by the same BS (i.e., BS 12) that also serves the source user 38 and that users 42 to 44 are each being served by an adjacent BS (i.e., BS 14). Further, based on the mapping correlation data 46 illustrated in FIG. 2, the server 20 may determine that the source user 38 has respective subject-matter interest of "patent law" that matches user 40's respective subject-matter interest of "patent law". Also, the server 20 may determine that the source user 38 has respective subject-matter interest of "basketball" that matches user 42's respective subject-matter interest of "basketball".

Moreover, as shown in FIG. 3, the server 20 receives from the source user 38 a communication having designated subject-matter interest of "painting". As such, the server 20 may determine that the source user 38 also has respective subject-matter interest of "painting" that matches user 44's respective subject-matter interest of "painting". So based on the server 20 determining that users 40 to 44 each have at least one subject-matter interest that matches at least one subject-matter interest of the source user 38, the server 20 may responsively identify users 40 to 44 each as a target user. Other illustrations are possible as well.

Once one or more target users have been identified, the server 20 may forward the communication that server 20 received from the source user to each identified target user. To do so, the server 20 could refer to respective registration information of each target user to determine respective contact information for a respective target user, such as a phone number of the respective target user and/or an identifier of a social network account of the respective target user (e.g., so that the respective target user may view the forwarded communication by way of the respective target user's social network account), among other options. And the server 20 may then forward the communication to each respective target user based on each respective target user's contact information. Moreover, in some situations, the server 20 could include in the forwarded communication contact information of the source user and/or location of the source user, among other possibilities.

Furthermore, after forwarding the communication, the server 20 may receive a reply communication from at least one the target users to whom the communication from the source user was forwarded. And upon the server 20 receiving the reply communication, the server 20 may be arranged to responsively forward the reply communication to the source user, such as to a destination specified in the source user's registration information (e.g., the source user's social network account) for example. Moreover, the forwarded reply communication may include additional information, such as a location of the target user initiating the reply communication and/or contact information of the target user initiating the reply communication, among other possibilities. This additional information may be included in various ways. For instance, a social networking application and/or a UE of the target user may be arranged to include the additional information in the reply communication (e.g., automatically or responsive to the target user's request) and/or the server 20 may be arranged to add the additional information to the reply communication, such as based on the respective target user's registration information for example. Other instances are also possible.

Figure 4:
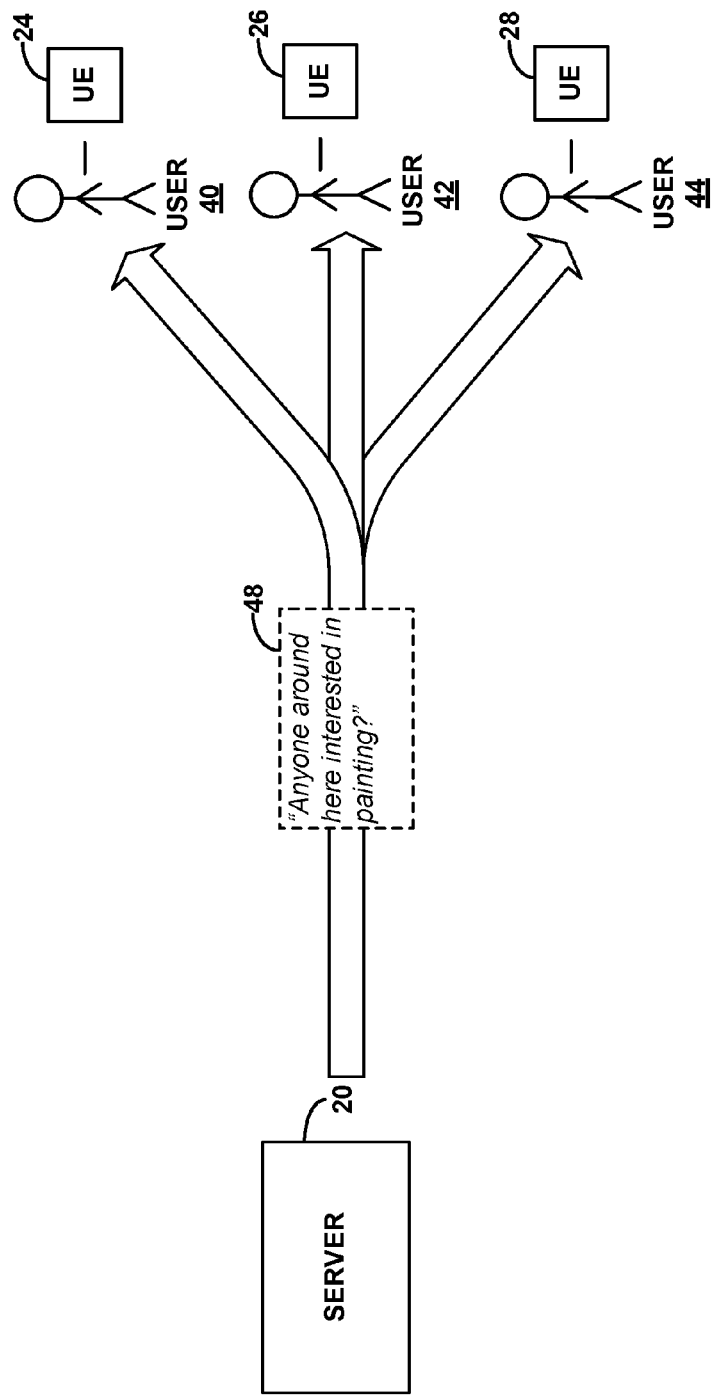
FIG. 4 illustrates the server forwarding the communication received from the source user to target users, in accordance with an example embodiment.
Figure 5:
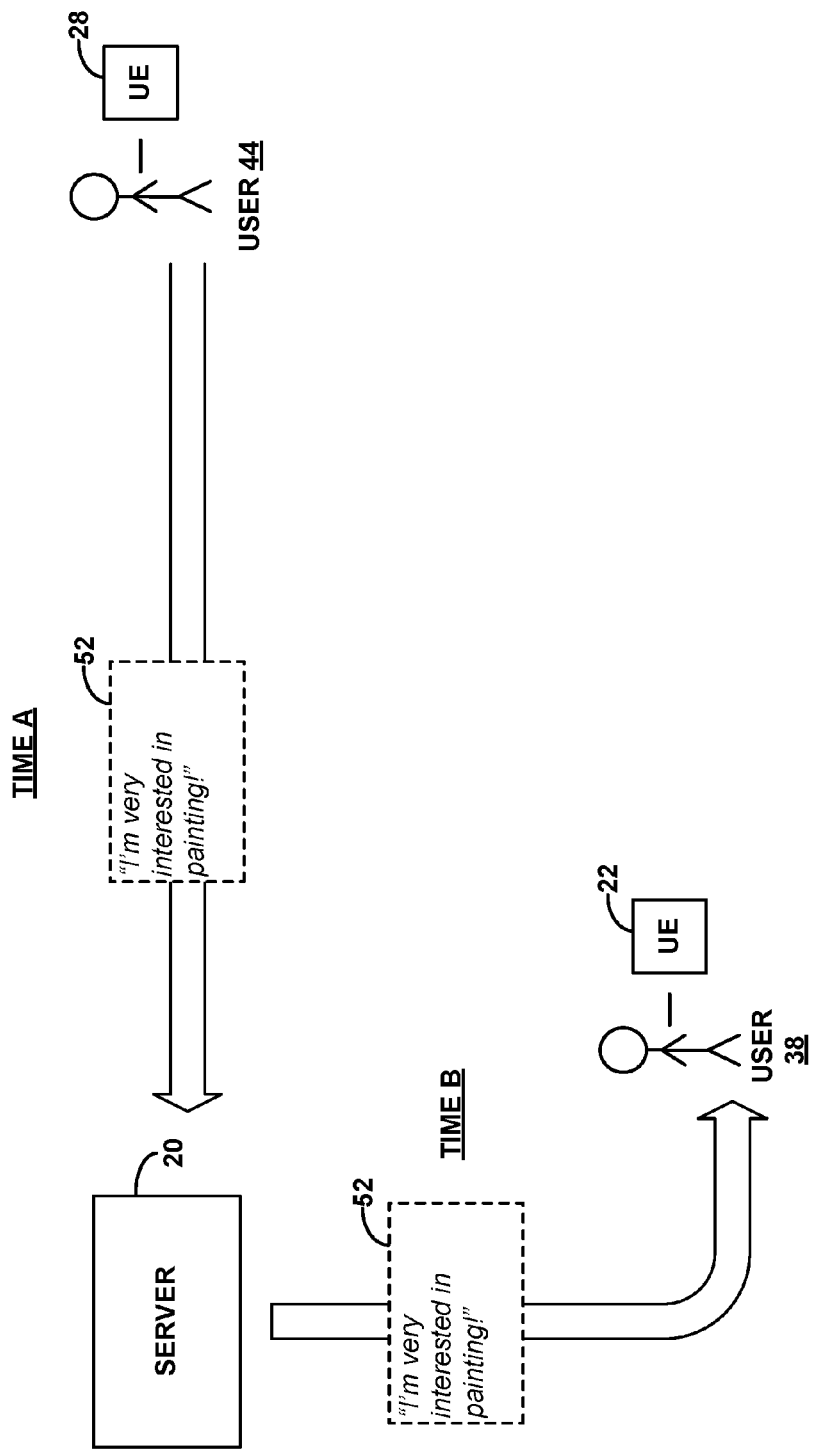
FIG. 5 illustrates the server receiving a reply communication from a target user and then forwarding the reply communication to the source user, in accordance with an example embodiment.

FIGS. 4 and 5 respectively illustrate the server 20 forwarding a communication to target users as well as the server 20 forwarding a reply communication to a source user. In particular, FIG. 4 illustrates the server 20 forwarding the communication 48 received from the source user 38 to each of the target users 40 to 44. In doing so, the server 20 may transmit the communication 38 to each respective target user (e.g., to a respective UE of the respective target user) via one or more of the networks 18, network infrastructure 16, and/or a respective BS (e.g., BS 12 or BS 14) that serves the respective target user. Also, FIG. 5 illustrates the target user 44 initiating a reply communication 52 that includes textual data that recites "I'm very interested in painting!" As shown, the server 20 may receive the reply communication 52 at a certain time A and may then forward the reply communication 52 to the source user 38 at a later time B (e.g., immediately after receiving the reply communication 52). In doing so, the server 20 may transmit the reply communication 52 to the source user 38 (e.g., to the UE 22 of the source user 38) via one or more of the networks 18, network infrastructure 16, and/or the BS 14.

In a further aspect, some implementations of the present disclosure may allow users to "opt-in" to or "opt-out" of receiving communications. For instance, a social network application on a respective user's UE may provide an option to enable the reception of communications from source users as well as an option to disable the reception of communications from source users. So when the server 20 identifies a respective user that has elected to disable the reception of communications from source users, then the server 20 may responsively avoid selecting that respective user as a target user to whom a communication from a source user is to be forwarded. Whereas, when the server 20 identifies a respective user that has elected to enable the reception of communications from source users, then the server 20 may responsively select that respective user as a target user (and ultimately forward a communication from a source user to this respective user) if the respective user has been identified as a target user given the factors discussed above. Other aspects are possible as well.

Figure 6:
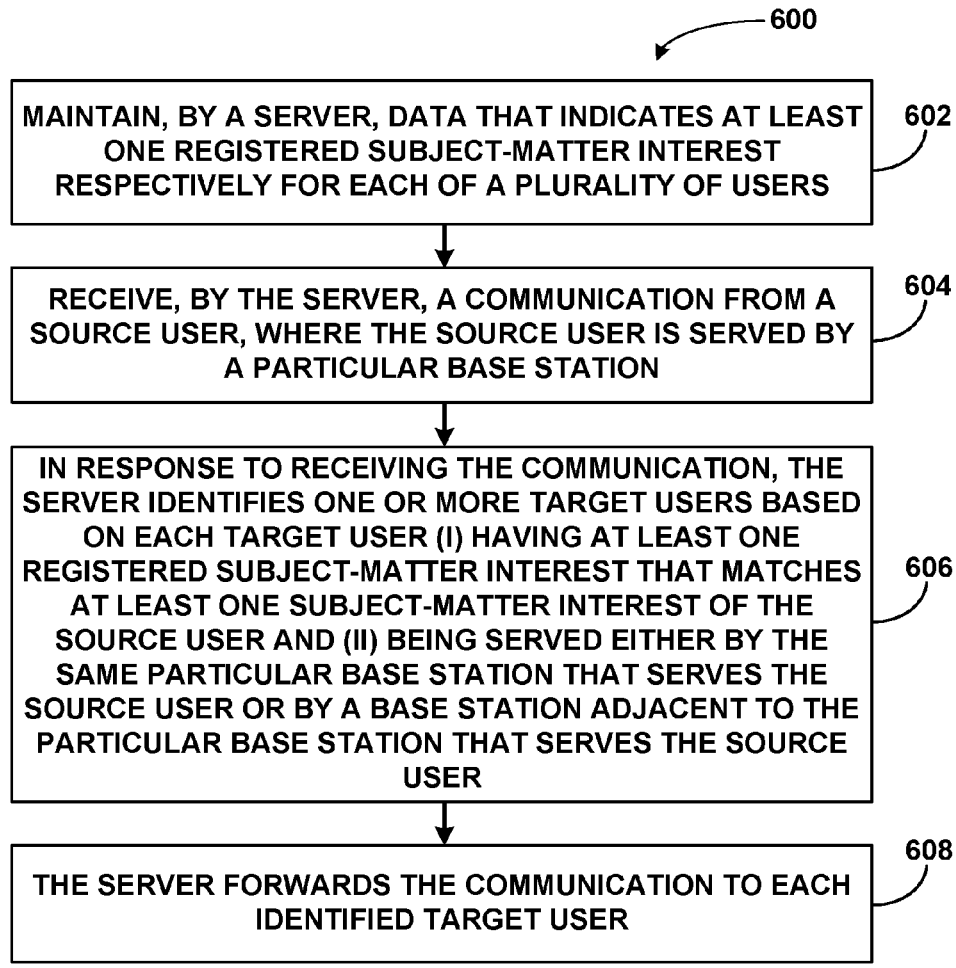
FIG. 6 is a flowchart illustrating a method to facilitate automatic distribution of a communication to user(s) having common subject-matter interest and served by same or adjacent base station, in accordance with an example embodiment.

FIG. 6 is next a flow chart illustrating a method 600, according to an example embodiment. Illustrative methods, such as method 600, may be carried out in whole or in part by component(s) and/or arrangement(s) in a wireless communication system, such as by the one or more of the components of the representative network shown in FIG. 1, with one or more of the components of the UE shown in FIG. 7 and further discussed below, with one or more of the components of the BS shown in FIG. 8 and further discussed below and/or with one or more of the components of the server shown in FIG. 9 and further discussed below. However, it should be understood that example methods, such as method 600, may be carried out by other entities or combinations of entities as well as in other arrangements, without departing from the scope of the disclosure.

Accordingly, as shown by block 602 in FIG. 6, method 600 involves maintaining, by a server, data that indicates at least one registered subject-matter interest respectively for each of a plurality of users. At block 604, method 600 then involves receiving, by the server, a communication from a source user. In particular, the source user is being served by a particular base station. At block 606, method 600 then involves, in response to receiving the communication, the server identifying one or more target users based on each target user (i) having at least one registered subject-matter interest that matches at least one subject-matter interest of the source user and (ii) being served either by the same particular base station that serves the source user or by a base station adjacent to the particular base station that serves the source user. And at block 608, method 600 then involves the server forwarding the communication to each identified target user.

Figure 7:
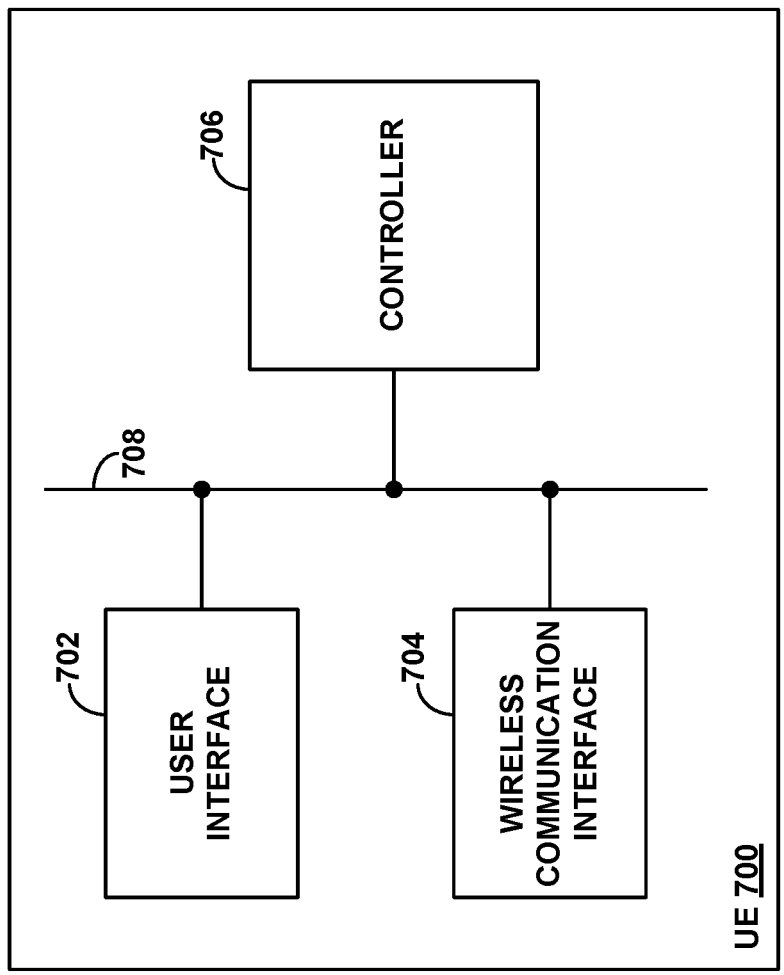
FIG. 7 is a simplified block diagram of a UE, in accordance with an example embodiment.

FIG. 7 is next a simplified block diagram of an example UE 700, showing some of the components that can be included in such a UE 700. As shown in FIG. 7, the example UE 700 includes a user interface 702, a wireless communication interface 704, and a controller 706, all of which may reside within or on a housing and be integrated or communicatively linked together by a system bus, network, or other connection mechanism 708.

User interface 702 is configured to allow the UE 700 to receive user input and provide user output. Thus, the user interface may include one or more input components such as a microphone, a camera, a keypad, and a touch-sensitive display. And the user interface may include one or more output components such as a sound speaker and a display screen. Further, the user interface may include analog-digital conversion circuitry, such for converting voice input to a digital representation of the voice and for converting a digital representation of voice into speech output.

Wireless communication interface 704 is configured to allow the UE 700 to engage in wireless communication over the air interface with a BS. In particular, the wireless communication interface 704 may include or be interconnected with one or more antenna structures each arranged to facilitate air interface communications. Also, the interface 704 may include a processing unit programmed with program instructions to facilitate communication in accordance with one or more communication protocols for instance.

Controller 706, which may effectively be part of the wireless communication interface or may be provided separately, may then or therefore be configured to cause the UE to carry out various UE operations, such as display and interaction with of a social network application for instance. As such, the controller 706 may take various forms. For instance, the controller 706 may be hard coded or provided as hardware such as an application specific integrated circuit or other structure. Alternatively or additionally, the controller 706 could be provided as one or more processors (e.g. one or more microprocessors), non-transitory data storage, and program instructions stored in the data storage and executable by the processor(s) to carry out the various operations.

Figure 8:
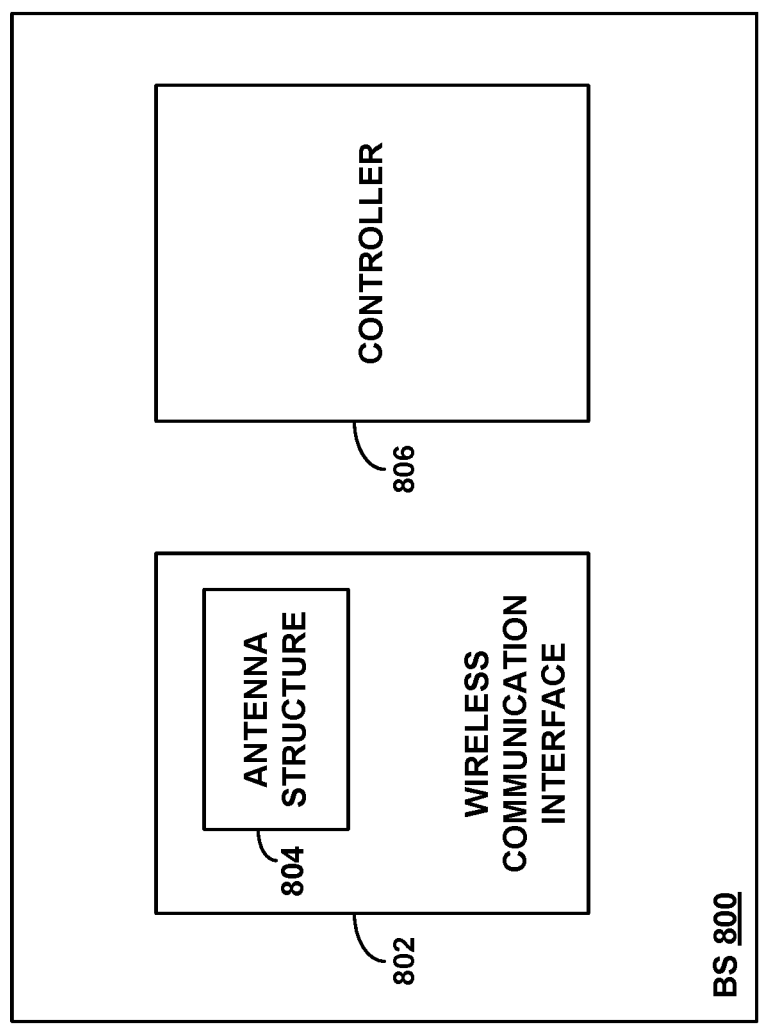
FIG. 8 is a simplified block diagram of a base station, in accordance with an example embodiment.

FIG. 8 is next a simplified block diagram of an example BS 800, showing some of the components that can be included in such a BS 800. As shown, the BS 800 includes a wireless communication interface 802 having an antenna structure (e.g., any BS antenna structure) 804 for wirelessly transmitting and receiving over an air interface between the BS 800 and a UE. Further, the BS 800 includes a controller (e.g., one or more programmed processing units or the like) 806, which may be integrated with the wireless communication interface (such as by being provided as a processing unit on a wireless communication chipset or the like) configured (e.g., programmed) to carry out various BS operations, such as communicating with a server for instance.

Figure 9:
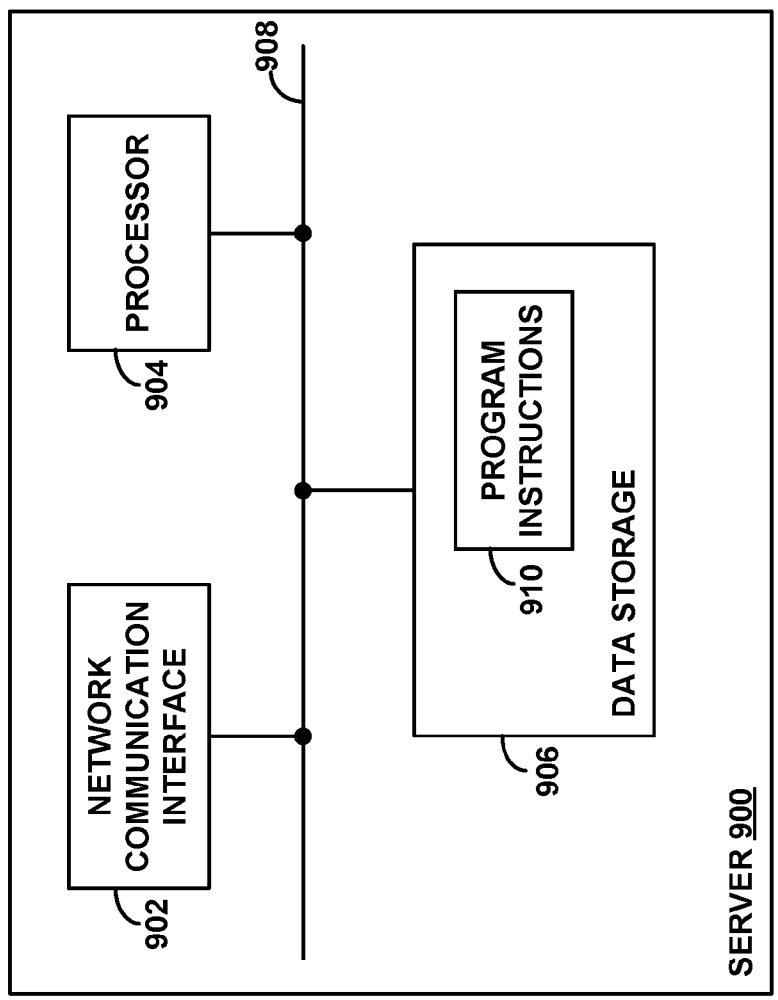
FIG. 9 is a simplified block diagram of a server, in accordance with an example embodiment.

Finally, FIG. 9 is next a simplified block diagram of a server 900, showing functional components that can be included in such an entity to facilitate implementation of the present method in practice. As shown, the example server 900 includes a network communication interface 902, a processor 904, and data storage 906, all of which may be coupled together by a system bus, network, or other connection mechanism 908.

Network communication interface 902 comprises one or more communication modules for facilitating communication on a network. Processor 902 then comprises one or more general purpose processors and/or one or more special purpose processors (e.g., digital signal processors, application specific integrated circuits, etc.) And data storage 906 comprises one or more volatile and/or non-volatile storage components. These various elements may be integrated together, distributed, or modified in various ways, and the server 900 may include more or fewer elements than these. As shown, data storage 906 may then include program instructions 910 executable by the processor 904 to carry out various server functions described herein, such as to facilitate automatic distribution of a communication to user(s) having common subject-matter interest and served by same or adjacent BS.

Exemplary embodiments have been described above. It should be understood, however, that variations from these embodiments are possible, while remaining within the true spirit and scope of the invention.

We claim:

1. A method comprising:
maintaining, by a server, data that indicates at least one registered subject-matter interest respectively for each of a plurality of users, wherein the server has access to service data that indicates, for each respective user of the plurality of users, a respective base station providing service to the respective user;
receiving, by the server, a communication from a source user, wherein the source user is served by a particular base station;
in response to receiving the communication, the server identifying one or more target users based on each target user (i) having at least one registered subject-matter interest that matches at least one subject-matter interest of the source user and (ii) being served either by the same particular base station that serves the source user or by a base station adjacent to the particular base station that serves the source user,
wherein identifying one or more target users based on each target user being served by the same particular base station comprises (i) based at least on the service data, determining that the source user is being served by the particular base station, (ii) in response to determining that the source user is being served by the particular base station, determining one or more other users also being served by the same particular base station that serves the source user, wherein determining the one or more other users is based at least on the service data, (iii) identifying one or more target users, from among the determined one or more other users also being served by the same particular base station, based on each target user having at least one registered subject-matter interest that matches the at least one subject-matter interest of the source user, and wherein identifying one or more target users based on each target user being served by a base station adjacent to the particular base station comprises (i) based at least on the service data, determining that the source user is being served by the particular base station, (ii) in response to determining that the source user is being served by the particular base station, identifying one or more base stations that are each adjacent to the particular base station that serves the source user, (iii) based at least on the service data, determining one or more other users each being served by one of the identified adjacent base stations, and (iv) identifying one or more target users, from among the determined one or more other users being served by one of the identified adjacent base stations, based on each target user having at least one registered subject-matter interest that matches the at least one subject-matter interest of the source user; and the server forwarding the communication to each identified target user.

2. The method of claim 1, wherein the received communication specifies the at least one subject-matter interest of the source user, the method further comprising:

based at least in part on the received communication, the server determining the at least one subject-matter interest of the source user.

3. The method of claim 1, wherein the source user is one of the plurality of users, the method further comprising:

based at least in part on the maintained data that indicates respective registered subject-matter interest for the source user, the server determining the at least one subject-matter interest of the source user.

4. The method of claim 1, further comprising:

after forwarding the communication, the server receiving a reply communication from at least one user of the identified target users and responsively forwarding the reply communication to the source user.

5. The method of claim 4, wherein the forwarded reply communication specifies at least one of (i) a location of the at least one user and (ii) contact information of the at least one user.

6. A server comprising:
one or more processors;
a non-transitory computer readable medium; and
program instructions stored on the non-transitory computer readable medium and executable by the one or more processors to:
maintain data that indicates at least one registered subject-matter interest respectively for each of a plurality of users, wherein the server has access to service data that indicates, for each respective user of the plurality of users, a respective base station providing service to the respective user;
receive a communication from a source user, wherein the source user is served by a particular base station;
in response to receiving the communication, identify one or more target users based on each target user (i) having at least one registered subject-matter interest that matches at least one subject-matter interest of the source user and (ii) being served either by the same particular base station that serves the source user or by a base station adjacent to the particular base station that serves the source user,
wherein the program instructions being executable to identify one or more target users based on each target user being served by the same particular base station comprises the program instructions being executable to (i) based at least on the service data, determine that the source user is being served by the particular base station, (ii) in response to determining that the source user is being served by the particular base station, determine one or more other users also being served by the same particular base station that serves the source user, wherein determining the one or more other users is based at least on the service data, and (iii) identify one or more target users, from among the determined one or more other users also being served by the same particular base station, based on each target user having at least one registered subject-matter interest that matches the at least one subject-matter interest of the source user, and wherein the program instructions being executable to identify one or more target users based on each target user being served by a base station adjacent to the particular base station comprises the program instructions being executable to (i) based at least on the service data, determine that the source user is being served by the particular base station, (ii) in response to determining that the source user is being served by the particular base station, identify one or more base stations that are each adjacent to the particular base station that serves the source user, (iii) based at least on the service data, determine one or more other users each being served by one of the identified adjacent base stations, and (iv) identify one or more target users, from among the determined one or more other users being served by one of the identified adjacent base stations, based on each target user having at least one registered subject-matter interest that matches the at least one subject-matter interest of the source user; and forward the communication to each identified target user.

7. The server of claim 6, wherein the received communication specifies the at least one subject-matter interest of the source user, and wherein the program instructions are further executable to:

based at least in part on the received communication, determine the at least one subject-matter interest of the source user.

8. The server of claim 6, wherein the source user is one of the plurality of users, and wherein the program instructions are further executable to:

based at least in part on the maintained data that indicates respective registered subject-matter interest for the source user, determine the at least one subject-matter interest of the source user.

9. The server of claim 6, wherein the program instructions are further executable to:

after forwarding the communication, receive a reply communication from at least one user of the identified target users and responsively forward the reply communication to the source user.

10. The server of claim 9, wherein the forwarded reply communication specifies at least one of (i) a location of the at least one user and (ii) contact information of the at least one user.

11. A wireless communication system comprising:
a plurality of base stations comprising at least a particular base station and one or more adjacent base stations each threshold proximate to the particular base station; and
a server configured to:

maintain data that indicates at least one registered subject-matter interest respectively for each of a plurality of users, wherein the server has access to service data that indicates, for each respective user of the plurality of users, a respective base station providing service to the respective user;

receive a communication from a source user, wherein the source user is served by the particular base station;

in response to receiving the communication, identify one or more target users based on each target user (i) having at least one registered subject-matter interest that matches at least one subject-matter interest of the source user and (ii) being served either by the same particular base station that serves the source user or by a base station adjacent to the particular base station that serves the source user, wherein the server being configured to identify one or more target users based on each target user being served by the same particular base station comprises the server being configured to (i) based at least on the service data, determine that the source user is being served by the particular base station, (ii) in response to determining that the source user is being served by the particular base station, determine one or more other users also being served by the same particular base station that serves the source user, wherein determining the one or more other users is based at least on the service data, and (iii) identify one or more target users, from among the determined one or more other users also being served by the same particular base station, based on each target user having at least one registered subject-matter interest that matches the at least one subject-matter interest of the source user, and wherein the server being configured to identify one or more target users based on each target user being served by a base station adjacent to the particular base station comprises the server being configured to (i) based at least on the service data, determine that the source user is being served by the particular base station, (ii) in response to determining that the source user is being served by the particular base station, identify one or more base stations that are each adjacent to the particular base station that serves the source user, (iii) based at least on the service data, determine one or more other users each being served by one of the identified adjacent base stations, and (iv) identify one or more target users, from among the determined one or more other users being served by one of the identified adjacent base stations, based on each target user having at least one registered subject-matter interest that matches the at least one subject-matter interest of the source user; and forward the communication to each identified target user.

12. The wireless communication system of claim 11, wherein the received communication specifies the at least one subject-matter interest of the source user, and wherein the server is further configured to:

based at least in part on the received communication, determine the at least one subject-matter interest of the source user.

13. The wireless communication system of claim 11, wherein the source user is one of the plurality of users, and wherein the server is further configured to:

based at least in part on the maintained data that indicates respective registered subject-matter interest for the source user, determine the at least one subject-matter interest of the source user.

14. The wireless communication system of claim 11, wherein the server is further configured to:

after forwarding the communication, receive a reply communication from at least one user of the identified target users and responsively forward the reply communication to the source user.

* * * * *